INVENTOR
Elmo Parker Crim
Hofgren, Wegner, Allen, Stellman & McCord
ATTORNEYS

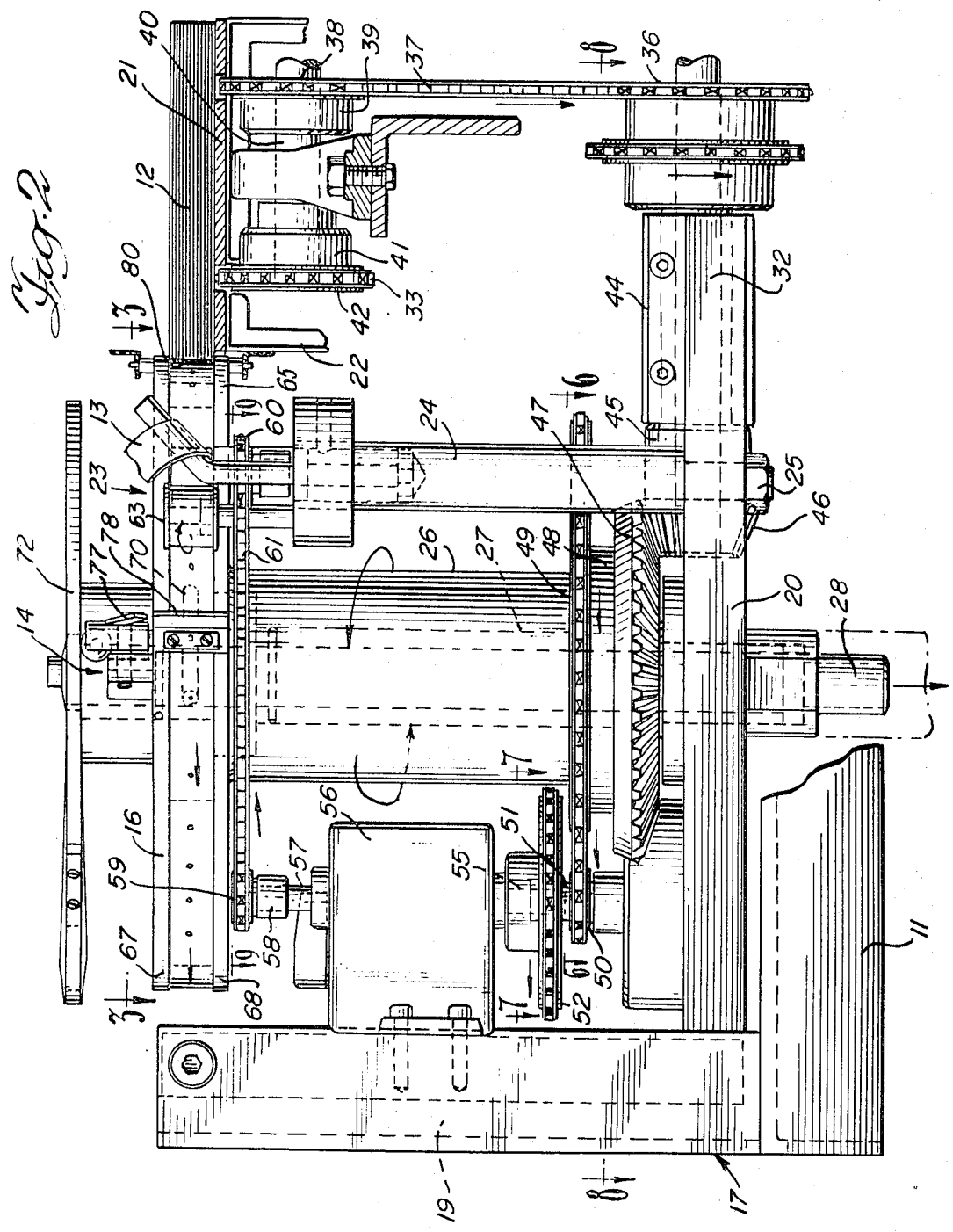

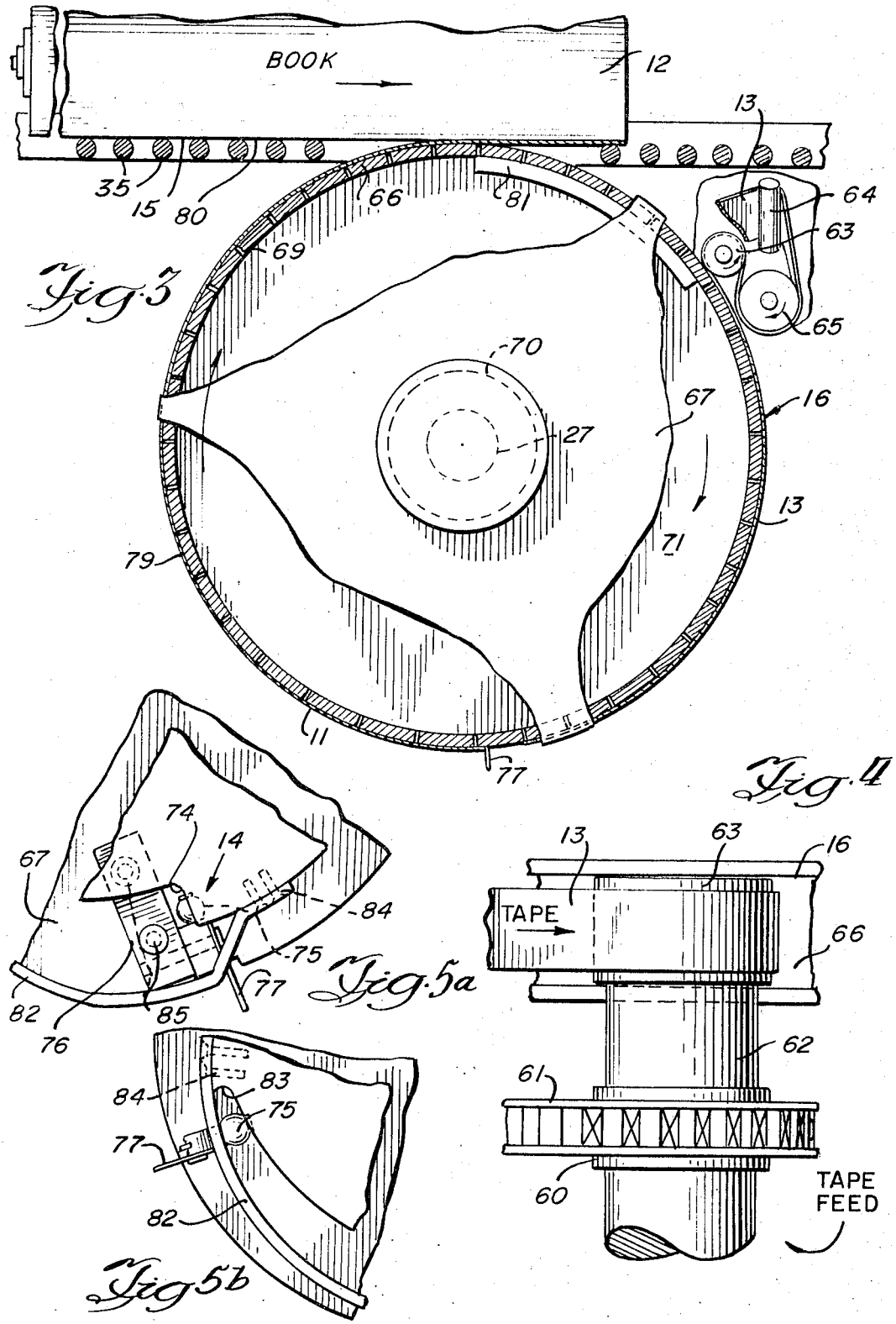

United States Patent Office 3,445,314
Patented May 20, 1969

3,445,314
STRIP MATERIAL APPLICATOR
Elmo Parker Crim, 9418 S. Albany Ave.,
Evergreen Park, Ill. 60642
Filed Oct. 22, 1965, Ser. No. 501,542
Int. Cl. B65c 9/18
U.S. Cl. 156—521                               8 Claims

ABSTRACT OF THE DISCLOSURE

An apparatus for providing a series of end pieces cut from the end of a strip of material having an adhesive coated surface. The apparatus includes a hollow cylindrical carrier and means for continuously advancing the strip material onto the circumferential surface of the carrier. Vacuum means are provided for yieldingly retaining the strip on the carrier circumferential surface. The strip advancing means causes the strip to advance at a constant rate slightly less than the linear rate of movement of the carrier circumferential surface whereby the strip moves at all times with the carrier circumferential surface but at a slightly slower rate. A knife mechanism is mounted on the carrier for accurately cutting the strip to define a severed end piece which moves directly with the carrier to an applying station. The vacuum retaining means comprises a plurality of spaced apertures in the circumferential surface which are closed at the applying station to provide facilitated transfer of the end piece onto an element for adhesion thereby by the adhesive coated surface thereof.

---

This invention relates to apparatus for providing pieces of strip material and in particular to apparatus for providing pieces of adhesive-backed strip material seriatim to a plurality of elements.

One known method of providing a piece of material on an element is to provide the material in a strip form, suitably cut from the strip a desired piece, or length, thereof, and then apply the piece to the element as by means of suitable adhesive or the like. The present invention comprehends an improved appartus for providing such pieces of strip material to a plurality of elements. In illustrating the invention, reference will be had to the utilization of the invention in connection with bookbinding apparatus wherein the pieces of strip material comprise pieces of adhesive-backed tape, with the apparatus being arranged to apply a piece of tape seriatim to the spines of book elements delivered seriatim through the apparatus.

Thus, a principal feature of the present invention is the provision of a new and improved apparatus for providing pieces of adhesive-backed material seriatim to a plurality of elements.

Another feature of the invention is the provision of such an apparatus having new and improved means for providing the pieces of material from a strip supply thereof.

A further feature of the invention is the provision of such an apparatus having new and improved means for accurately disposing the pieces of material relative to the elements to which they are affixed, thereby obviating the need for trimming and the like.

Still another feature of the invention is the provision of such an apparatus having new and improved means for separating an end piece of material from the strip supply and accurately spacing it therefrom for accurately locating the separated piece relative to the element to which it is to be affixed.

A yet further feature of the invention is the provision of such an apparatus including means for providing adjustable spacing between the respective pieces cut seriatim from the strip so as to conform to the size and spacing of the elements to which the pieces are respectively affixed.

A further feature of the invention is the provision of such an apparatus including means for moving the elements seriatim through an applying position, means for providing a strip of material having an adhesive coated surface, a carrier having a slide surface, means for yieldingly retaining the end of the strip on the slide surface with the adhesive surface exposed, means for moving the carrier relative to the strip to have the strip end retrogress on the slide surface, means for separating an end piece from the strip end to permit the retaining means to cause the end piece to travel directly with the carrier surface and thereby become spaced from the following retrogressing end of the strip, the element moving means and the carrier moving means being arranged to cause the surface to be at the applying position when an element is thereat and press the adhesive surface of the piece against the element to adhere thereto, and means for releasing the retaining means to permit the pressed end piece to be transferred from the carrier surface to the element.

Another feature of the invention is the provision of such an apparatus wherein the carrier comprises a rotatable member, and the means for yieldingly retaining the end of the strip on the carrier comprises vacuum pressure means.

Other features and advantages of the invention will be apparent from the following description taken in connection with the accompanying drawing wherein:

FIGURE 2 is an end elevation thereof looking from the right as shown in FIGURE 1;

FIGURE 3 is a fragmentary plan view with portions broken away illustrating the means for transferring the tape pieces seriatim to the books;

FIGURE 4 is a fragmentary enlarged vertical section taken substantially along the line 4—4 of FIGURE 1;

FIGURE 5a is a fragmentary plan view of the strip cutting means as disposed at a point just prior to the strip cutting position;

FIGURE 5b is a fragmentary plan view of the strip cutting means at a point wherein it is substantially fully retracted for a subsequent cutting operation;

Figure 1:
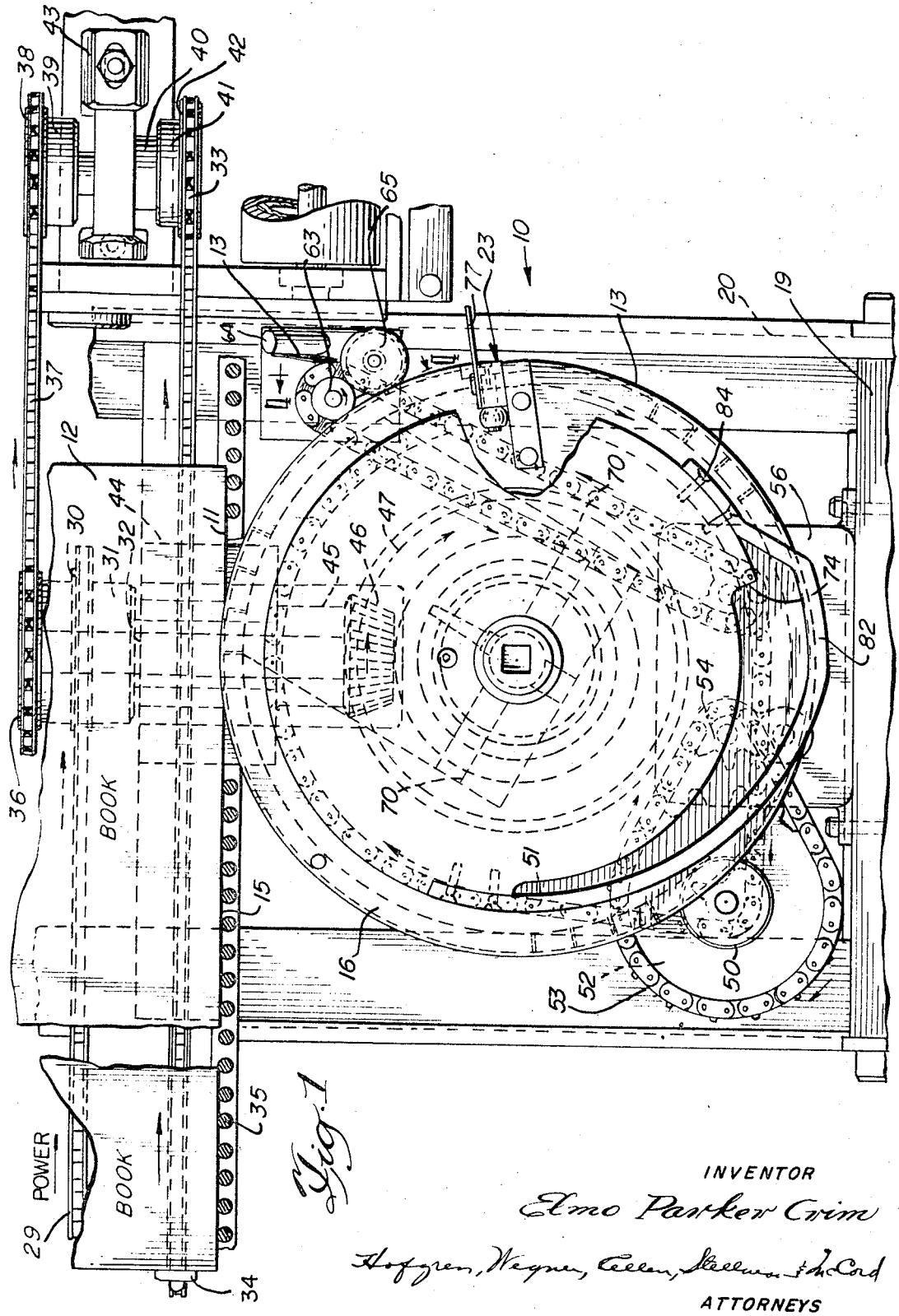
FIGURE 1 is a fragmentary plan view of an apparatus embodying the invention.

In the exemplary embodiment of the invention as disclosed in the drawing, an apparatus generally designated 10 is shown to comprise an apparatus for providing pieces of adhesive-backed material 11 to a plurality of elements such as books 12 from a supply strip 13 of the material which may be in any suitable form such as roll form or the like. The pieces 11 are cut from the end of the supply strip 13 by a suitable knife mechanism generally designated 14 so as to correspond accurately in length to the length of the respective books 12. Further, the apparatus 10 is arranged to deliver the severed lengths, or pieces, 11 to the book spine 15 by means of a suitable rotary carrier 16 so as to be accurately positioned on the book spine without overlapping the opposite ends of the book and thereby avoid the costly and time consuming trimming operations conventionally necessitated in the known methods of the applying of spine reinforcement material to book spines.

More specifically, apparatus 10 may be mounted on a suitable stand 17 including a base 18, end wall 19, and a cross support 20. The books 12 are delivered along the upper surface of a table 21 carried on a suitable frame 22. The tape supply mechanism generally designated 23 is carried on the upper end of an upright post 24 secured to the cross piece 20 by suitable means such as bolt 25. The carrier 16 is carried on a tubular member 26 coaxially surrounding a fixed tubular member 27 upstanding from cross piece 20 and having a lower end portion 28 adapted to be connected to a suitable suction means (not shown).

Referring now to FIGURE 1, the drive of the apparatus 10 is from a suitable power supply (not shown) through a chain drive 29 driving a sprocket 30 on a hub 31 carried on a shaft 32. The books 12 are moved along the upper surface of table 21 by means of a chain 33 provided with suitable lugs 34 at spaced intervals for advancing the books 12 at spaced intervals along the table top and laterally against a plurality of guides 35 upstanding from the edge thereof confronting the carrier 16. The chain 33 as shown in FIGURE 1, is driven from the input power supply by means of a sprocket 36 on hub 31, a chain 37 driven by sprocket 36 and driving a sprocket 38 on a hub 39 carried on a shaft 40 and carrying a hub 41 on which a sprocket 42 is fixed for driving chain 33. The shaft 40 may be suitably journalled in a bearing 43.

Figure 6:
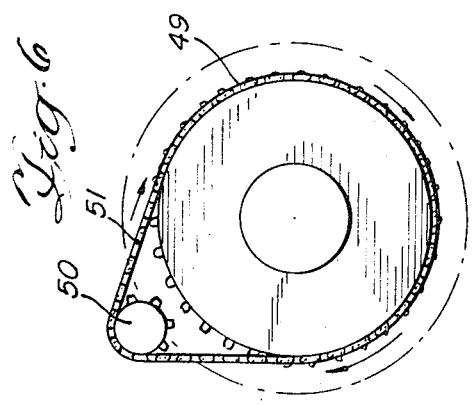
FIGURE 6 is a fragmentary horizontal section taken substantially along the line 6—6 of FIGURE 2.
Figure 7:
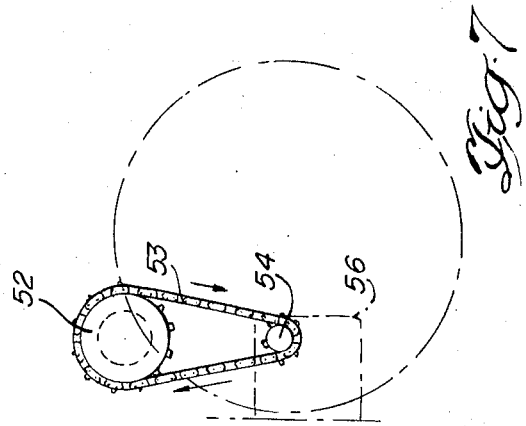
FIGURE 7 is a fragmentary horizontal section taken substantially along the line 7—7 of FIGURE 2.

Shaft 32 is journalled in a suitable bearing 44 and carries on an end thereof a hub 45 provided with a beveled gear 46. Beveled gear 46 meshes with a ring beveled gear 47. The tubular member 26 is fixedly secured to a hub 48 on the gear 47 to upstand vertically upwardly therefrom, as shown in FIGURE 2. The hub 48 further carries a large diameter sprocket 49 which as shown in FIGURE 6 drives a small sprocket 50 by means of a chain 51. The small sprocket 50 is carried on a shaft 51 which further carries a sprocket 52. A chain 53 is driven by sprocket 52 to drive a sprocket 54 carried on an input shaft 55 of a variable speed reducer 56. Any suitable speed reducer as known to those skilled in the art may be employed; in the illustrative example a Model 10E-400 Zero-Max is illustrated. The output shaft 57 of the reducer 56 is provided with a hub 58 carrying a sprocket 59 which drives a sprocket 60 through a chain 61. Sprocket 60 is secured to a shaft 62 which carries at its upper end a tape advance wheel 63 which as shown in FIGURE 4 is laterally aligned with the carrier 16 for rotation about an axis parallel to the axis of the rotatable carrier. As shown in FIGURE 3, the strip 13 is fed around a guide post 64 and an idler roller 65 about the drive wheel 63 and against the peripheral side wall 66 of the carrier 16 which as best seen in FIGURE 2 is recessed slightly within top wall 67 and bottom wall 68 of the carrier and has a vertical height slightly greater than the width of the strip 13.

The strip 13 is yieldingly retained against the carrier wall 66 herein by means of a plurality of radial ports 69 substantially uniformly distributed circumferentially about the carrier. The walls 66, 67 and 68 cooperatively define a sealed hollow enclosure which communicates with the interior of the tubular member 27 through a plurality of suitable openings 70 in an upper portion of the member 27 extending to within the space 71 defined by the walls 66, 67 and 68. The wall 68 closes off the space 71 from the interior of the tubular member 26 so that the suction pressure applied to the lower end 28 of the tubular member 27 provides a suction pressure within the space 71 for yieldingly retaining the strip 13 against the carrier wall 66 as a result of the suction forces developed thereagainst through the ports 69.

By means of the variable speed reducer 56 the linear rate of advance of strip 13 may be made to be slightly slower than the linear rate of advance of the books 12. At the same time as the carrier 16 is driven from a point in the power chain before the variable speed reducer, the peripheral rate of speed of the carrier wall 66 may be made to be exactly the same as the linear rate of speed of the books 12. Thus, as seen in FIGURE 3, as the strip 13 is fed in a clockwise direction with the clockwise rotation of the carrier 16, the tape is slid back, or retrogressed along the slide surface defined by wall 66 against the yielding retaining action of the vacuum pressure applied through the port 69.

Fixedly spaced above the carrier 16 is a cam plate 72 having a recessed portion 73 provided with a sharp drop shoulder 74 defining a cut-off position of the apparatus as shown in FIGURE 1. The knife mechanism 14 is fixedly associated with the carrier 16 so as to travel therewith. As shown in FIGURES 5a and 5b, when the knife mechanism reaches the cam shoulder 74, a ball follower 75 which rides under the cam plate 72 is freed to pivot upwardly from the plane of the paper as seen in FIGURE 5a by means of a conventional spring biased actuator 76. This pivoting action causes the knife blade 77 of the knife mechanism to swing sharply downwardly, as seen in FIGURE 2, against the stationary cutter blade 78 to sever the strip 13 at this point and thereby form the end piece 11. As the end piece 11 is now freed from the retarding action of the strip drive, it may move directly with the carrier wall 66 and, thus, move slowly away from the cut end of the remaining strip 13 which is sliding somewhat backwardly along the surface of the wall 66 as previously described. In the illustrative embodiment, the strip material is provided with an adhesive outer surface 79 which as shown in FIGURE 3 is pressed against the spine 80 of the book 12 by the pressure of the wall 66 thereagainst. The piece 11 is released from the wall 66 by a port-blocking member 81, as shown in FIGURE 3, which blocks off the ports as they move to the point of pressure application and therebeyond for a travel of approximately 60 degrees.

Figure 8:
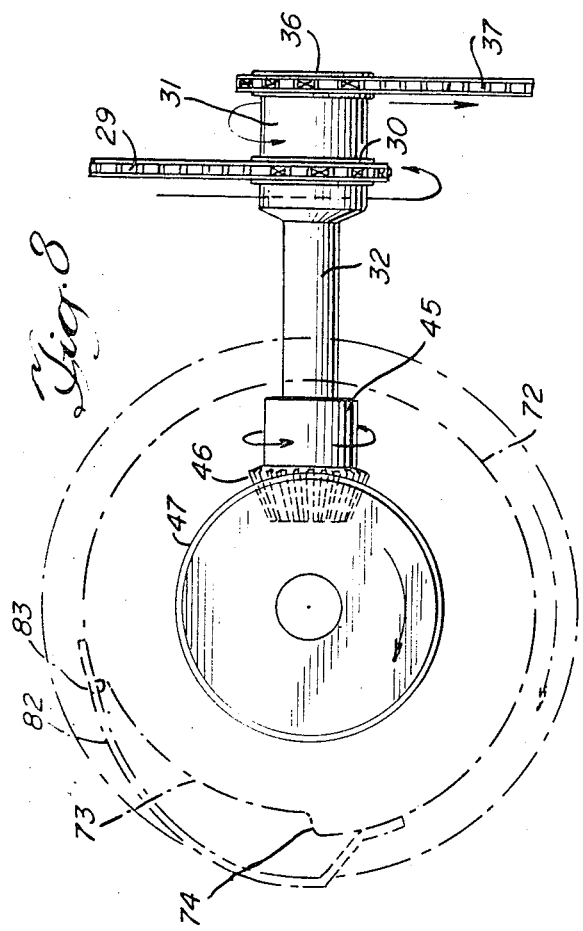
FIGURE 8 is a fragmentary horizontal section taken substantially along the line 8—8 of FIGURE 2.
Figure 9:
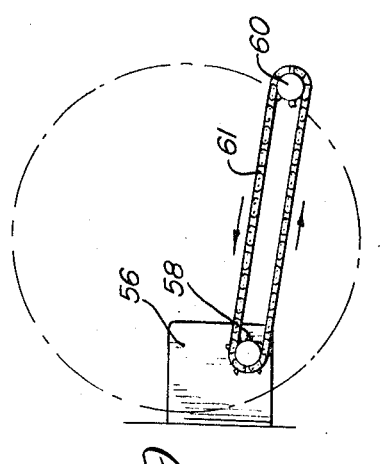
FIGURE 9 is a fragmentary horizontal section taken substantially along the line 9—9 of FIGURE 2.

As shown in FIGURE 5b, the follower 75 is limited in its outward pivoting movement by a bar 82 which as shown in FIGURE 8 is curved back inwardly to the periphery of the cam plate 72 so as to urge the follower 75 back against the action of pivoting means 76 to underlie the plate 72 at the clockwise end 83 of the cam recess 73. As shown in FIGURES 5a and 5b, the bar 82 may be secured to the cam plate 72 by suitable means such as screws 84. As shown in FIGURE 5a, the knife mechanism 14 may be secured to the carrier wall 67 by suitable means such as screws 85.

The operation of apparatus 10 is extremely simple. The tape strip 13 is fed, as discussed above, onto the peripheral wall 66 of the carrier 16 at a speed slower than the linear speed of the wall 66 with the specific speed thereof being controlled by the variable speed reducer 56 so as to provide a preselected accurately maintained ratio of strip advance speed to carrier speed. The knife 77 cuts the end of the strip 13 at the cam position 74 so as to free an end piece of the tape from the remaining strip. The end piece is then free to move directly with the carrier on the wall 66 which presses it against the spine 80 of the book 12. As the position of the knife mechanism 14 is fixed on the carrier 16 and the drive of the carrier is positively coordinated with the position of the lug 34 on the book drive chain 33, the piece 11 of strip material is accurately positioned lengthwise of the book. Thus, no trimming of the opposite ends of the strip need be effected, thereby eliminating this costly and time consuming conventional bookkbinding step. The length of the strip is obviously a function of the speed of the strip advance as set by the reducer 56, and as in the illustrated embodiment, the reducer 56 comprises an infinitely adjustable reducer within its range of operation the strip length may be accurately made to conform to any book length as desired. Illustratively, the pieces 11 may be made to have a length in the range of from 9 to 25 inches with the carrier having a circumferential extent of approximately 32 inches. Where the strip material comprises conventional adhesive coated plastic tape material, ports 69 having a diameter of $\frac{1}{32}$ inch with the wall 66 being approximately ⅜-inch thick are found to provide a highly satisfactory yielding retention of the strip 13 while effectively positively holding the cut length 11.

While I have shown and described one embodiment of my invention it is to be understood that it is capable of many modifications. Changes, therefore, in the construction and arrangement may be made without departing from the spirit and scope of the invention as defined in the appended claims.

I claim:

1. Apparatus for providing pieces of adhesive-backed material seriatim to a plurality of elements comprising: means for moving said elements seriatim through an applying position; means for continuously advancing a strip of material having an adhesive coated surface; a carrier having a slide surface; means for yieldingly retaining the end of the continuously advancing strip on said slide surface with the adhesive surface exposed; means for moving said carrier slide surface at a rate slightly greater than the rate of advance of said strip whereby said strip moves at all times with said slide surface but at a slightly slower rate such that said strip end retrogresses at a preselected rate on said slide surface; means for separating an end piece from said strip end to permit said retaining means to cause said end piece to travel directly with said carrier surface and thereby become spaced from the following retrogressing end of said strip, said element moving means and said carrier moving means being arranged to cause said surface to be at said applying position when an element is thereat and press said adhesive surface of said piece against said element to adhere thereto; and means for releasing the retaining means at said applying station to permit the pressed end piece to be transferred from said carrier surface to said element.

2. The apparatus of claim 1 wherein said yieldingly retaining means comprises means for applying a holding force against said strip at longitudinally spaced portions thereof other than at said applying station.

3. The apparatus of claim 1 wherein drive means are provided having a common driving means and mechanically synchronized portions for driving said carrier and said strip providing means at a preselected speed ratio wherein the linear strip advance speed is slightly less than the linear slide surface speed.

4. The apparatus of claim 1 wherein said elements comprise books having spines and said element moving means comprises means for positioning the books with the spines juxtaposed to said slide surface at said applying station whereat said strip lengths are applied to said spines.

5. The apparatus of claim 1 wherein said separating means for causing said strip lengths to be applied in centered relationship to said elements and have a length slightly less than the length of the portion of the elements to which they are applied thereby eliminating the need for trimming the ends of the strip lengths after application to the elements.

6. The apparatus of claim 1 wherein said retaining means comprises vacuum means, and spaced aperture means closed at said applying station for transmitting a vacuum pressure to said adhesive coated strip on said slider surface other than at said applying station.

7. The apparatus of claim 6 wherein said carrier slide surface is cylindrical and said aperture means effectively extends less than the circumferential extent thereof as a result of the closure thereof at said applying station.

8. The apparatus of claim 1 wherein the means for separating the end piece from the strip end comprises a knife mechanism carried on the carrier.

References Cited

UNITED STATES PATENTS

| | | | |
|---|---|---|---|
| 2,483,458 | 10/1949 | Fischer et al. | 156—521 |
| 2,990,081 | 6/1961 | De Neui et al. | 156—521 |

DOUGLAS J. DRUMMOND, *Primary Examiner.*